(12) United States Patent
Tipton et al.

(10) Patent No.: US 11,643,136 B2
(45) Date of Patent: May 9, 2023

(54) END-OF-TRAVEL RELIEF IN A POWER STEERING SYSTEM

(71) Applicant: R.H. SHEPPARD CO., INC., Hanover, PA (US)

(72) Inventors: Jeffrey Tipton, Gettysburg, PA (US); Manjunath Terwad, York, PA (US); Jared Pitzer, Red Lion, PA (US)

(73) Assignee: R.H. SHEPPARD CO., INC., Hanover, PA (US)

( * ) Notice: Subject to any disclaimer, the term of this patent is extended or adjusted under 35 U.S.C. 154(b) by 482 days.

(21) Appl. No.: 16/925,406

(22) Filed: Jul. 10, 2020

(65) Prior Publication Data

US 2021/0009195 A1    Jan. 14, 2021

Related U.S. Application Data

(60) Provisional application No. 62/930,731, filed on Nov. 5, 2019, provisional application No. 62/873,414, filed on Jul. 12, 2019.

(51) Int. Cl.
| | |
|---|---|
| *B62D 5/065* | (2006.01) |
| *B62D 5/06* | (2006.01) |
| *B62D 5/08* | (2006.01) |
| *B62D 5/12* | (2006.01) |

(52) U.S. Cl.
CPC .............. *B62D 5/065* (2013.01); *B62D 5/061* (2013.01); *B62D 5/081* (2013.01); *B62D 5/12* (2013.01)

(58) Field of Classification Search
CPC .......... B62D 5/061; B62D 5/081; B62D 5/12; B62D 5/065; F15B 15/24; F15B 13/024
USPC ......................................................... 180/441
See application file for complete search history.

(56) References Cited

U.S. PATENT DOCUMENTS

| | | | | |
|---|---|---|---|---|
| 3,047,087 A | * | 7/1962 | Jablonsky | ................ B62D 5/08 91/401 |
| 3,872,774 A | | 3/1975 | Forster et al. | |
| 3,905,277 A | | 9/1975 | Rosell | |
| 3,968,733 A | * | 7/1976 | Lang | ..................... B62D 5/061 91/466 |
| 4,153,133 A | * | 5/1979 | Anderson | ............. B62D 5/061 180/429 |

(Continued)

FOREIGN PATENT DOCUMENTS

| | | | |
|---|---|---|---|
| DE | 1104837 B | * | 4/1961 |
| DE | 1160318 B | * | 12/1963 |

(Continued)

*Primary Examiner* — Jacob B Meyer
*Assistant Examiner* — Myles A Harris
(74) *Attorney, Agent, or Firm* — Warner Norcross + Judd LLP

(57) ABSTRACT

An improved power steering assembly is provided. The power steering assembly includes an end-of-travel mechanism and a valve cartridge that is actuated by left and right actuator rings of the end-of-travel mechanism, the actuator rings extending partially around an output shaft. The actuator rings can be individually set for the desired end-of-travel relief to limit the maximum system pressure when the steering assembly approaches the desired axle stop setting. The valve cartridge provides an end-of-travel function and a pressure relief function and is in fluid communication with the left and right pressure chambers to recirculate hydraulic fluid in the event of a power off condition.

20 Claims, 16 Drawing Sheets

(56) References Cited

U.S. PATENT DOCUMENTS

| | | | |
|---|---|---|---|
| 4,170,925 A | 10/1979 | Katz et al. | |
| 4,261,248 A * | 4/1981 | Elser | B62D 5/061 91/401 |
| 4,354,422 A * | 10/1982 | Nishikawa | B62D 5/061 180/428 |
| 4,433,613 A * | 2/1984 | Abt | B62D 5/061 91/380 |
| 5,186,272 A | 2/1993 | Smith | |
| 6,520,277 B1 * | 2/2003 | Bowman | B62D 5/12 92/13.5 |
| 8,091,449 B2 | 1/2012 | Fuchigami et al. | |
| 8,353,382 B2 | 1/2013 | Janz et al. | |
| 8,746,740 B2 | 6/2014 | Tanaka | |
| 8,955,640 B2 | 2/2015 | Ishikawa et al. | |
| 9,415,795 B2 | 8/2016 | Hagiwara et al. | |
| 2002/0074041 A1 * | 6/2002 | Niessen | F15B 15/065 137/385 |
| 2007/0204432 A1 * | 9/2007 | Nagel | F15B 15/24 16/239 |
| 2012/0272765 A1 * | 11/2012 | Fuechsel | F16C 35/045 74/416 |
| 2018/0086370 A1 | 3/2018 | Wong et al. | |
| 2018/0118255 A1 | 5/2018 | Wong et al. | |
| 2022/0073132 A1 * | 3/2022 | Pitzer | B62D 5/061 |

FOREIGN PATENT DOCUMENTS

| | | | |
|---|---|---|---|
| DE | 1166637 B * | 3/1964 | |
| DE | 1168269 B * | 4/1964 | |
| DE | 1291644 B | 3/1969 | |
| DE | 2056066 A1 | 5/1972 | |
| DE | 2323522 A1 * | 11/1974 | |
| DE | 2615219 A1 | 10/1977 | |
| DE | 210724 A1 * | 6/1984 | |
| DE | 102021106889 B3 * | 10/2021 | |
| DE | 102021106884 B3 * | 11/2021 | |
| GB | 1251225 A * | 10/1971 | |
| GB | 1259499 A | 1/1972 | |
| GB | 2102753 A | 2/1983 | |
| KR | 100378305 B1 * | 6/2003 | |
| KR | 100919744 B1 * | 9/2009 | |
| WO | WO-2010063515 A1 * | 6/2010 | F15B 15/065 |

\* cited by examiner

END-OF-TRAVEL RELIEF IN A POWER STEERING SYSTEM

CROSS-REFERENCE TO RELATED APPLICATIONS

This application claims the benefit of U.S. Provisional Application 62/873,414, filed Jul. 12, 2019, and U.S. Provisional Application 62/930,731, filed Nov. 5, 2019, the disclosures of which are incorporated by reference in their entirety.

FIELD OF THE INVENTION

The present invention relates to power steering systems with end-of-travel limiters and optional pressure relief for commercial trucks and other applications.

BACKGROUND OF THE INVENTION

Many existing power steering systems include a control valve to selectively supply a working fluid (e.g., a hydraulic fluid) into first and second pressure chambers on either side of a piston. The working fluid assists the movement of the piston laterally, which otherwise relies on a recirculating ball screw to convert rotation of a steering wheel input shaft into linear travel of the piston. Linear travel of the piston causes rotation of a sector gear, which is in turn connected to a pitman arm. In typical power steering systems, the pitman arm converts the angular motion of the sector gear into linear motion needed to steer the wheels.

Particularly for large commercial trucks, the power-assisted movement of the piston is limited by one or more poppet valves. When the piston approaches its extreme travel in either direction, the stem of the limiting poppet valve makes contact with the piston. As the piston travel continues, the limiting poppet is unseated and some of the working fluid is diverted to a return line. As more working fluid is diverted by action of the poppet valve, steering effort increases. The piston can travel to its mechanical stop, however the maximum steering assistance is reduced to protect steering components from excessive stresses.

In addition to poppet valves, many existing power steering systems include a pressure relief valve, sometimes referred to as a bypass valve, to prevent over pressurization of the power steering assembly. The pressure relief valve permits movement of the working fluid from one side of the piston to the other side of the piston during non-operation of the hydraulic pump. In addition, working fluid displaced from one side of the piston to the other side of the piston prevents reservoir flooding and limits the internal hydraulic pressure to a predetermined maximum value. Hydraulic pressure in excess of the predetermined maximum value causes the pressure relief valve to open a channel to the reservoir return side of the steering assembly.

Despite their acceptance, existing power steering systems suffer from a number of disadvantages. For example, the activation range of end-of-travel relief systems is often limited to a particular range of operation (e.g., 15-25 degrees less than full travel). The adjustment range can be limited to by the amount of travel that the poppet valves can accommodate while being seated within their respective carriers. Also by example, the effective turn angles of vehicles are often reduced due to the tolerance stack of component parts. Relief may begin up to five degrees before axle stop contact, however certain commercial vehicles may not be able to reach the axle stops dynamically. Further by example, existing pressure relief valves suffer from the early onset of crack pressure as well as performance drift and packing constraints.

Accordingly, there remains a continued need for an improved power steering assembly having an end-of-travel function and an optional pressure relief function. In particular, the remains a continued need for an improved power steering assembly that can be used across a variety of vehicles with improved durability and accessibility over existing systems without unsatisfactory increases in packaging size requirements or additional tooling.

SUMMARY OF THE INVENTION

An improved power steering assembly with end-of-travel relief is provided. The power steering assembly includes an end-of-travel mechanism having left and right actuator rings extending partially around an output shaft. Movement of the actuator rings against one or more valve heads causes excess fluid to divert from one side of a piston to the other side of a piston. The actuator rings can be individually set for the desired end-of-travel relief to limit the maximum system pressure when the steering assembly approaches the desired axle stop setting.

In one embodiment, the actuator rings are mounted to a splined sector gear shaft and include left and right cams, respectively. The actuator rings include a radial spring force to selectively disengage from the splined sector gear shaft during re-setting of ring gears. A reset gear includes first and second tangs for resetting of the actuator rings, the reset gear being intermeshed with a rotatable screw gear. Once configured for a given sector gear, the cams of the left and right actuator rings engage a valve head, optionally within two degrees of the desired axle stop setting. The valve assembly decreases the pressure within the higher of the left and right pressure chambers to provide end-of-travel relief.

In one embodiment, a valve cartridge includes an integrated pressure relief function and end-of-travel function. In another embodiment, a valve cartridge includes a pressure relief valve and left and right poppet valves that function in the event of a loss of flow from a steering pump. In either embodiment, if a loss of flow is experienced, the sector gear is capable of manual steering by circulating fluid from one pressure chamber to the other pressure chamber. When pressure builds on the exhausting side of the steering piston, check valves open to move fluid into the left and right pressure chambers.

In these and other embodiments, the valve cartridge includes a pressure relief valve. The pressure relief valve includes a poppet valve in fluid communication with the left and right pressure chambers to recirculate hydraulic fluid in the event of a power off condition, for example. The pressure relief valve is used in conjunction with, or in lieu of, a relief valve located in the hydraulic steering pump. The pressure relief valve is a differential pressure area poppet valve, optionally extending parallel to left and right poppet valves as part of a cartridge valve assembly, thereby sharing structural and sealing requirements.

As discussed below, the improved power steering system can reduce maximum system pressure when the steering gear approaches the axle stop setting on a vehicle. In particular, the end-of-travel mechanism limits the maximum system pressure to a rated value and includes internal recirculation that allows fluid to move from one pressure chamber to another in the event of a power off condition. The end-of-travel poppet valve actuation point can also be set to a more precise value that does not depend on the mechanical tolerance stack-up of component parts. In addition, the pressure relief valve is conveniently packaged as part of a cartridge assembly with the end-of-travel poppet valves and lends itself to a high degree of automation as a stand-alone unit. Potential performance improvements of the pressure relief valve include the precision control of the crack/relief pressure of the pressure relief valve and the stable performance of the pressure relief valve over time, particularly when compared to existing pressure relief valves using a smaller seat area with higher contact stresses.

These and other features and advantages of the present invention will become apparent from the following description of the invention, when viewed in accordance with the accompanying drawings and the appended claims.

DETAILED DESCRIPTION OF THE CURRENT EMBODIMENTS

Figure 1:
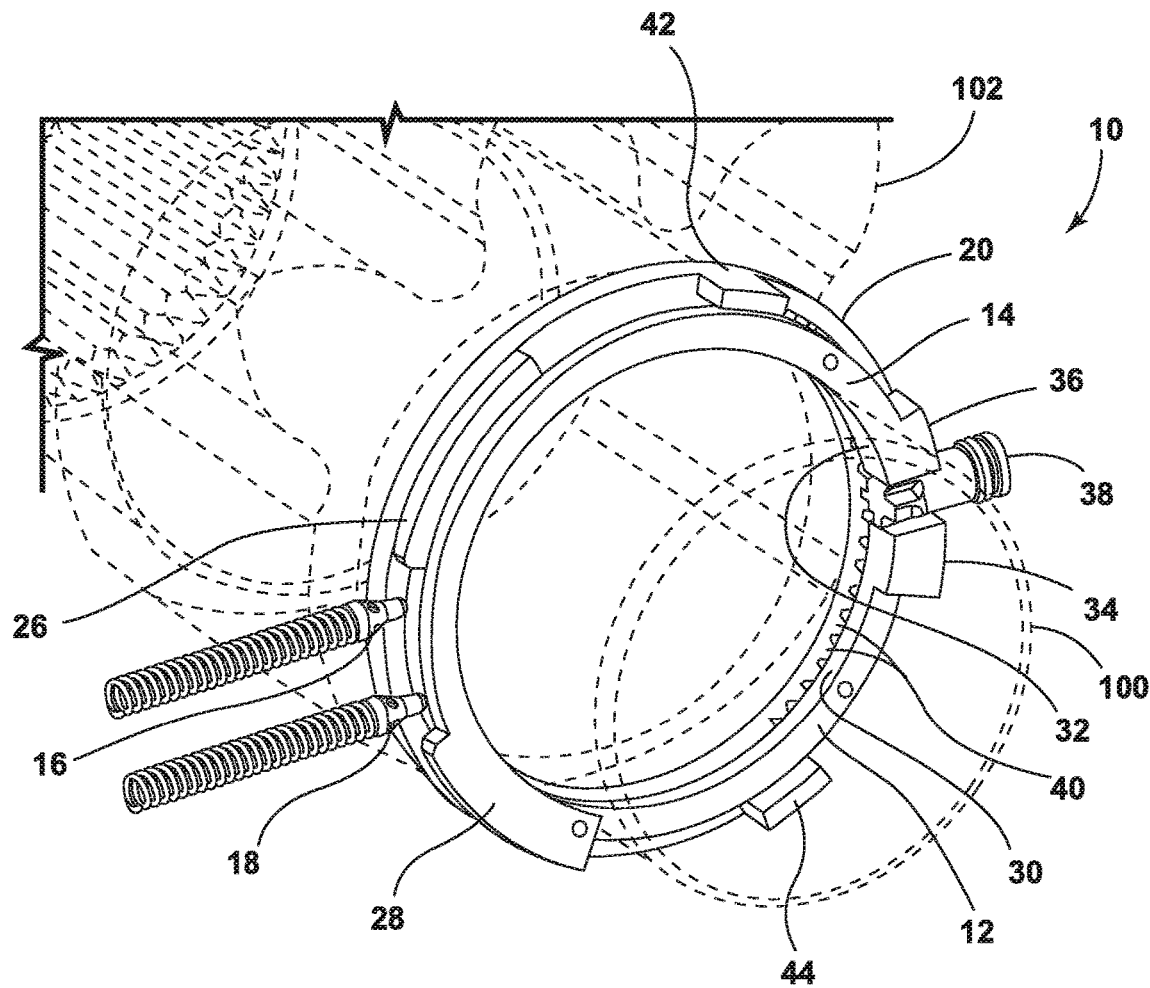
FIG. 1 is a perspective view of an end-of-travel mechanism for a power steering assembly in accordance with one embodiment of the present invention.

Referring to FIG. 1-7, an end-of-travel mechanism for a power steering assembly is illustrated and generally designated 10. The end-of-travel mechanism 10 generally includes left and right actuator rings 12, 14 extending partially around a splined sector gear shaft 100 for engaging a first poppet valve 16 and a second poppet valve 18, respectively, as described below in connection with FIGS. 8-9, or for engaging a single poppet valve 146 or 210, as described below in connection with FIGS. 14-19. As generally discussed below, the left and right actuator rings 12, 14 are moveable in unison with a sector gear shaft 100 and are resettable with rotation of a reset gear 20. The poppet valve or valves are contained within a valve cartridge, the valve cartridge optionally including a bidirectional pressure relief valve. The valve cartridge provides at least the following functions in the current embodiment: pressure relief, end-of-travel, and recirculation. The end-of-travel mechanism and the valve cartridge are discussed in greater detail below.

I. End-of-Travel Mechanism

As noted above, the end-of-travel mechanism 10 generally includes a rotary construction having left and right actuator rings 12, 14 that are mounted about a sector gear shaft 100. The sector gear shaft 100 extends from the sector gear 102, which converts linear travel of a steering piston into rotation of a pitman arm. The sector gear shaft 100 is splined in the current embodiment, such that the actuator rings 12, 14 are movable in unison with the sector gear shaft 100. The actuator rings 12, 14 are resilient in the radial direction, however, and extend partially around the sector gear shaft 100, e.g., approximately 270 degrees around the sector gear shaft 100. Consequently, the actuator rings 12, 14 can selectively disengage from the splined teeth of the sector gear shaft 100 during resetting operations.

In addition, each actuator ring 12, 14 includes a corresponding cam 26, 28 extending radially outwardly for engaging a valve, for example respective first and second poppet valves 16, 18. The cams 26, 28 span approximately thirty degrees in the current embodiment and extend radially outwardly. The inner radial surface 30, 32 of each actuator ring 12, 14 includes teeth (not shown) that engage the splined sector gear shaft 100, such that that each actuator ring 12, 14 rotates in unison with the sector gear 100. As also shown in FIG. 1, the actuator rings 12, 14 are axially offset from and directly adjacent to each other, such that the right actuator ring 14 partially overlies the left actuator ring 12. Further, each actuator ring includes an enlarged stop 34, 36 distal from the corresponding cam 26, 28 for resetting of the end-of-travel mechanism 10 in a manner discussed more fully below.

Figure 2:
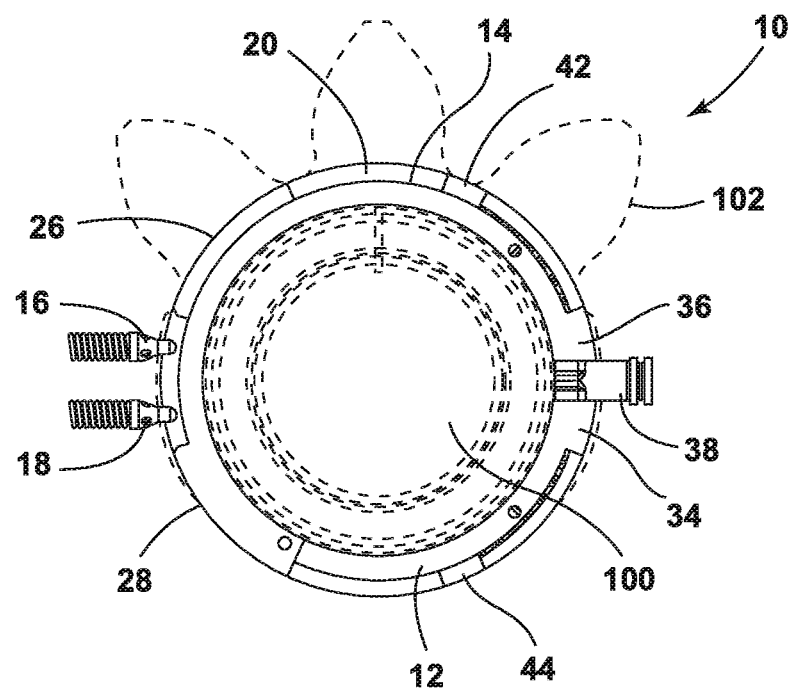
FIG. 2 illustrates the end-of-travel mechanism of FIG. 1 with actuator rings in the reset position.
Figure 3:
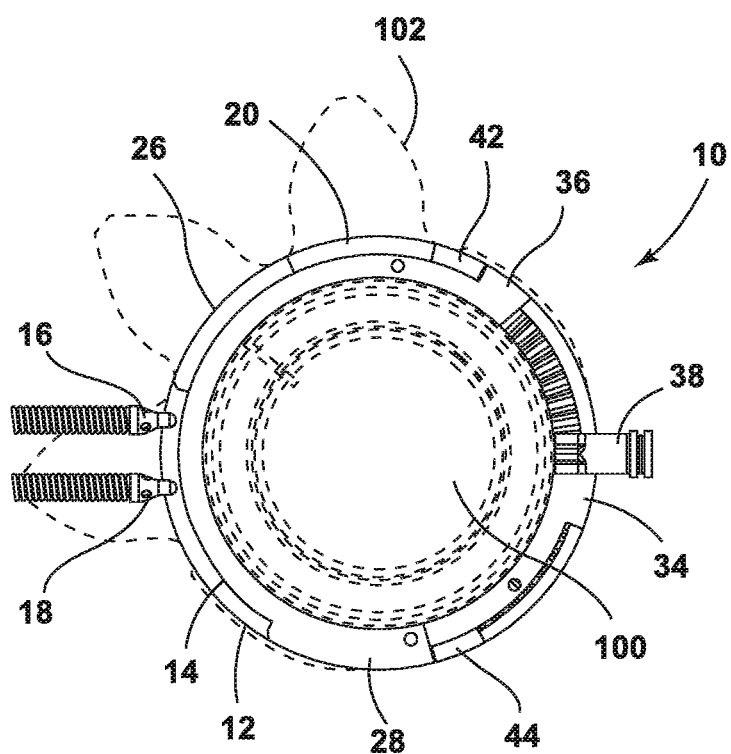
FIG. 3 illustrates the end-of-travel mechanism of FIG. 1 with the left actuator ring in the full-left position.
Figure 4:
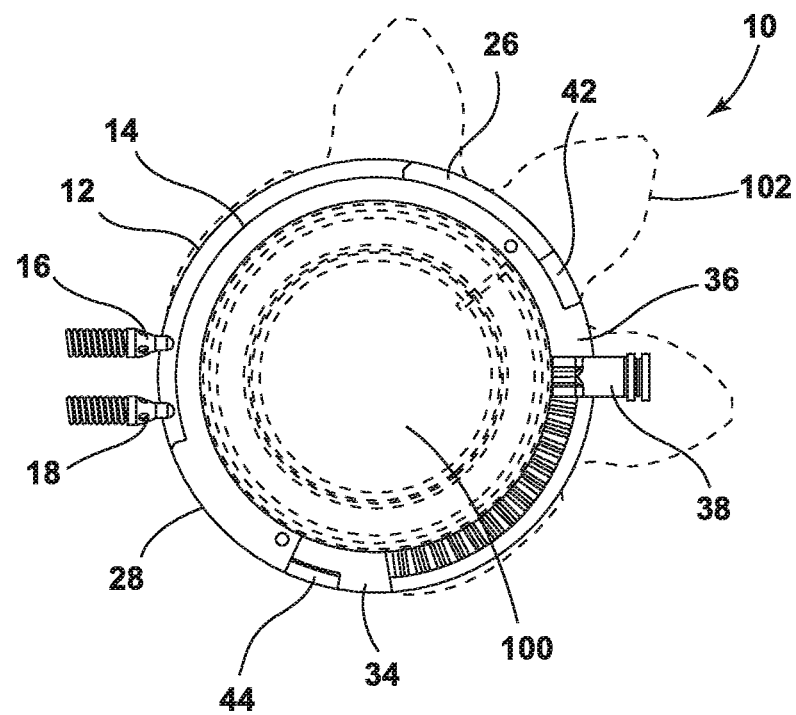
FIG. 4 illustrates the end-of-travel mechanism of FIG. 1 with the right actuator ring in the full-right position.

The end-of-travel mechanism 10 in the reset position (as shipped) is shown in FIG. 2. Each ring actuator 12, 14 is mounted about the sector gear shaft 100, with the sector gear 102 in the neutral position. In addition, each stop 34, 36 is at its right most maximum setting in abutment with a screw gear 38. The screw gear 38 is intermeshed with gear teeth 40 on an axial surface of the reset gear 20, such that rotation of the screw gear 38 causes clockwise or counter-clockwise rotation of the reset gear 28. To set the left actuator ring 12 as shown in FIG. 3, the sector gear 102 is rotated left (counter-clockwise as shown) to a full stop position. The left actuator ring 12 does not rotate, despite being splined to the sector gear shaft 100, being prevented by the screw gear 38. To likewise set the right actuator ring 14 as shown in FIG. 4, the sector gear 102 is rotated right (clockwise as shown) to a full stop position. The left actuator ring 12 rotates with the sector gear shaft 100, however the right actuator ring 14 is stopped by the screw gear 38, despite being splined to the sector gear shaft 100. The sector gear 102 is then returned to the neutral position as shown in FIG. 5, with the cams 26, 28 being in position to engage poppet valves 16, 18 within approximately two degrees of full travel of the sector gear.

Figure 6:
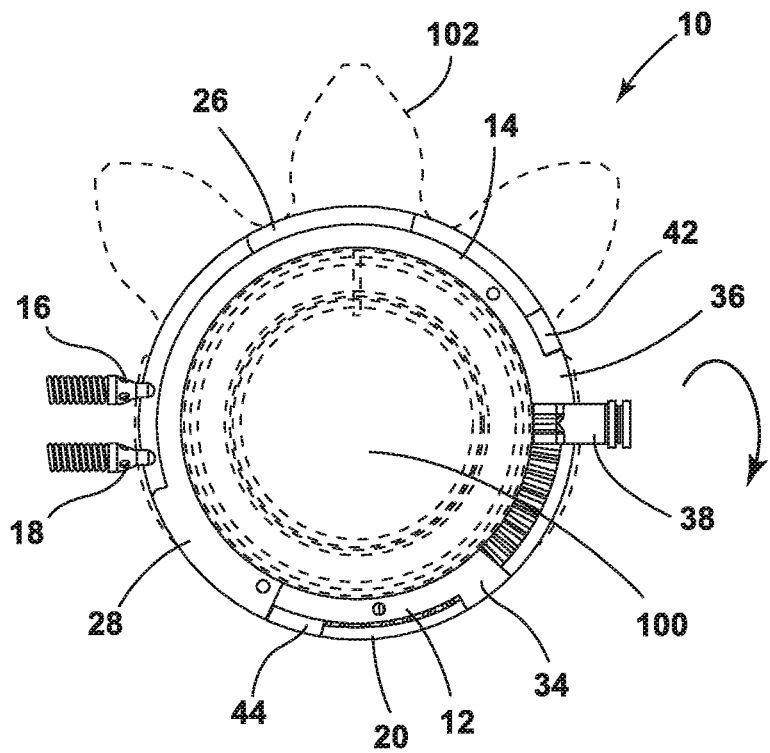
FIG. 6 illustrates resetting the left actuator ring of FIG. 1 with rotation of a screw gear that is intermeshed with a reset ring.
Figure 7:
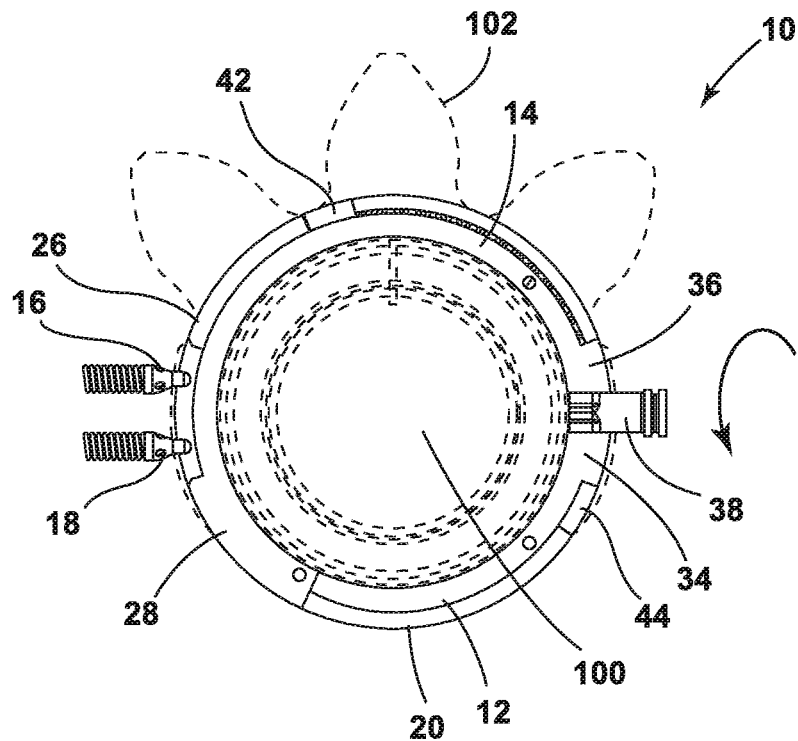
FIG. 7 illustrates resetting the right actuator ring of FIG. 1 with rotation of a screw gear that is intermeshed with a reset ring.

In order to reset the right actuator ring 14 as shown in FIG. 6, the reset gear 20 is rotated clockwise via rotation of the screw gear 38 by hand or with a suitable implement. The reset gear 20 includes a first tang 42 for engaging the right travel stop 36, thereby resetting the right actuator ring 14 until it bottoms out on the screw gear 38. Turning the reset gear 20 counter-clockwise via rotation of the screw 38 in the opposing direction causes a second tang 44 to engage the left travel stop 36, thereby resetting the left actuator ring 12 until it bottoms out on the screw gear 38. Torque applied to the screw gear 38 causes the reset gear 20 to index its position on the sector gear shaft 100 towards the reset position shown in FIG. 2. Each tang 42, 44 extends in an axial direction from the reset gear 20 with a length equal to the combined thickness of the left actuator ring 12 and the right actuator ring 14.

Figure 5:
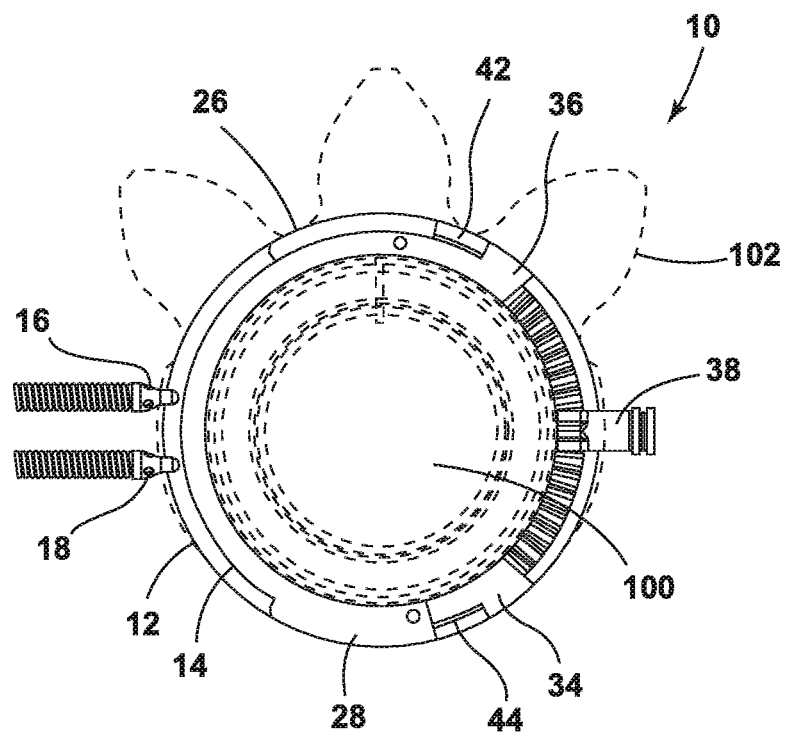
FIG. 5 illustrates the end-of-travel mechanism of FIG. 1 with the left and right actuator rings in the calibrated position for the associated sector gear.

In the minimum set position as shown in FIG. 2, the left and right cams 26, 28 are minimally spaced from the poppet valves 16, 18, with the maximum spacing being shown in FIG. 5. The activation range is approximately forty degrees in the current embodiment, with no appreciable increase in packaging sizes over existing systems. The poppet valves 16, 18 are selected such that the force required to actuate each poppet valve 16, 18 is less than the radial spring force of the left and right actuator rings 12, 14. This ensures that the poppet valves 16, 18 open when contacted by the left and right cams 26, 28, rather than displace the left and right actuator rings 12, 14 about the sector gear shaft 100. When the left or right poppet valve 16, 18 is actuated by the left or right cam 26, 28, respectively, the limiting poppet valve is unseated and some of the working fluid is diverted to a return line, thereby reducing the maximum steering assistance to protect steering components from excessive stresses.

To reiterate, the end-of-travel mechanism 10 includes two actuator rings 12, 14 installed back-to-back on pre-formed serrations of a sector gear shaft 100. Each actuator ring provides relief for one direction of travel. The actuator rings have a residual radial spring force that engages teeth with serrations on the shaft 100. The actuator rings rotate with the shaft 100 until they engage a fixed screw gear 38 during the setting operation. Steering torque causes each ring gear to index its position on the shaft 100 when engaged with the screw gear 38, which occurs until the vehicle reaches its axle stop position. Once set, an actuator cam 26, 28 on each actuator ring will engage with a poppet valve located in the combination valve approximately two-degrees before the set point. The actuator ring remains at its set point because the force required to actuate the poppet is much less than the setting force. The poppet valves 16, 18 act as reverse flow check valves. Bias springs keep the poppet valves 16, 18 in initial contact with their seats. Steering pressure increases the check valve seating force until the actuator cam 26, 28 on an actuator ring 12, 14 lifts and unseats the poppet valve 16, 18 at the end of travel. Flow is passed from high pressure to exhaust through a poppet orifice as long as it is mechanically unseated.

II. Valve Cartridge

Figure 8:
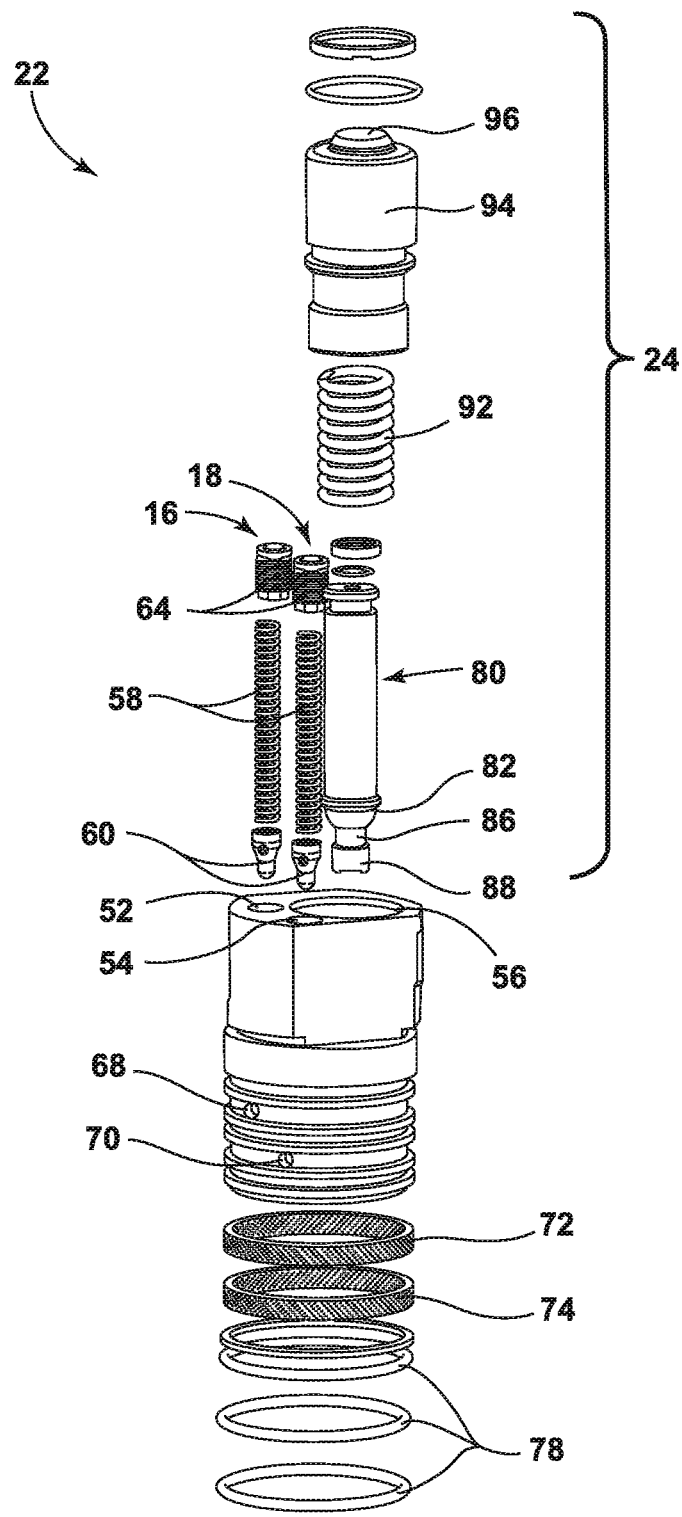
FIG. 8 is an exploded view of a valve cartridge including left and right end-of-travel poppet valves and a bi-directional pressure relief valve.
Figure 9:
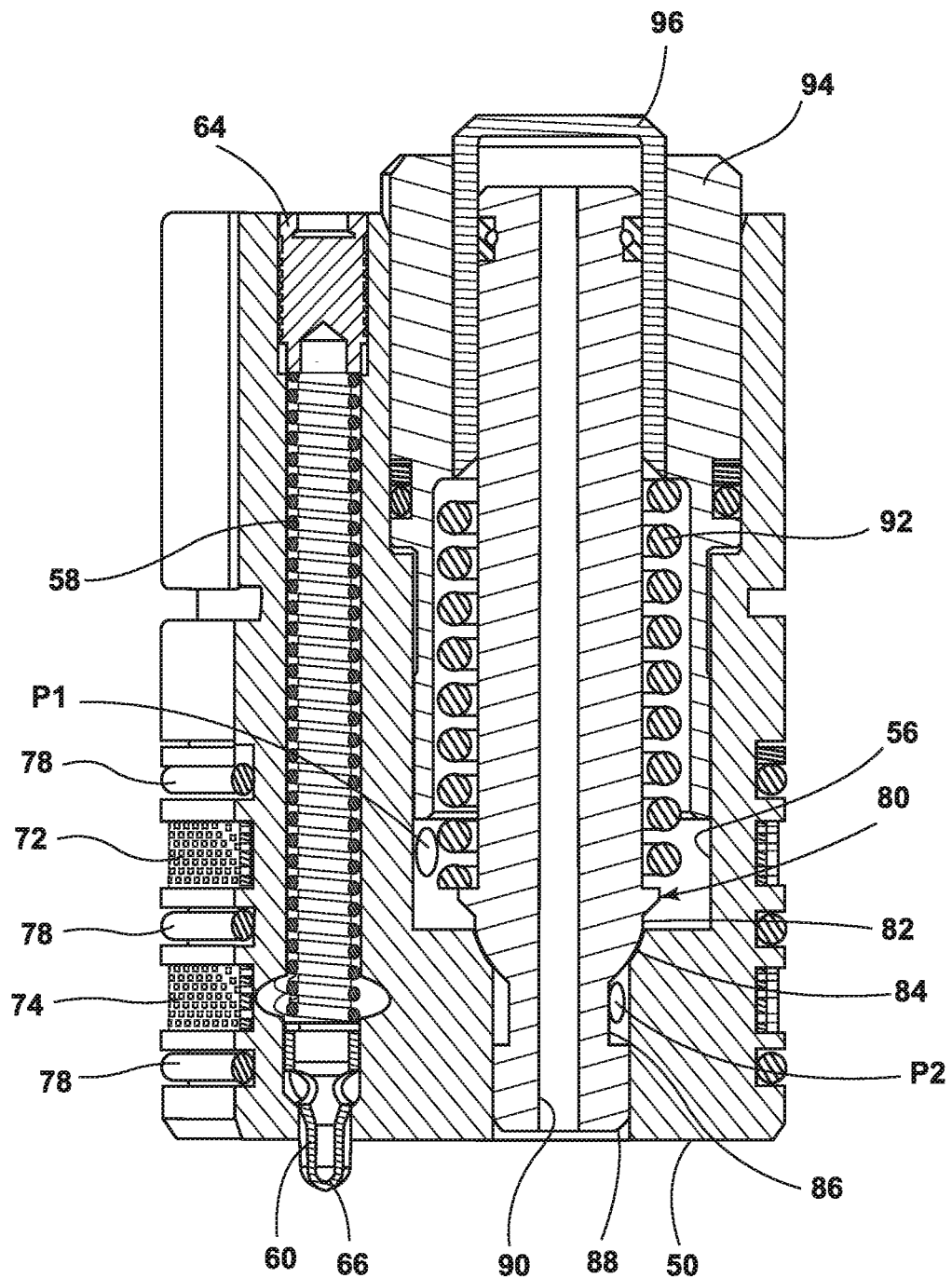
FIG. 9 is a cross-sectional view of the valve cartridge of FIG. 8 illustrating the left and right end-of-travel poppet valves and a bi-directional pressure relief valve.

Referring now to FIGS. 8-9, a valve cartridge in accordance with one embodiment is illustrated and generally designated 22. The valve cartridge 22 includes the above-mentioned left and right poppet valves 16, 18 and an optional pressure relief valve 24 contained within a cartridge housing 50. The cartridge housing 50 is arranged on one side of the power steering assembly and is generally cylindrical, with the poppet valves 16, 18 and the pressure relief valve 24 being in parallel alignment with each other.

More specifically, the cartridge housing 50 includes first and second bores 52, 54 for the poppet valves 16, 18 and a third, larger bore for the pressure relief valve 24. Each poppet valve 16, 18 includes a compression spring 58 for biasing a valve member 60 against a conical valve seat, distal from a threaded end cap 64. The valve member 60 includes a stem 66 that protrudes from the cartridge housing 50 to make contact with a cam of the end-of-travel mechanism 10. The cartridge housing 50 additionally includes first and second ports 68, 70 that are enclosed by screens 72, 74 to eliminate debris from interfering with the end-of-travel relief function. The screens 72, 74 are seated within annular channels 76 in the exterior surface of the cartridge housing 50, the annular channels being bordered by one or more O-rings 78. Alternative embodiments include first and second spool valves to discharge hydraulic fluid to a return line in place of the left and right poppet valves 16, 18.

As also shown in FIGS. 8-9, the pressure relief valve 24 is bidirectional poppet valve in the present embodiment, being adapted to cause working fluid to flow between the pressure chambers (on either side of the steering piston) for pressure relief or for recirculation. In the current embodiment, the pressure relief valve 24 is in fluid communication with the left and right pressure chambers (through screens 72, 74) to recirculate hydraulic fluid in the event of a power off condition. The pressure relief valve 24 is used in conjunction with, or in lieu of, a relief valve located in the hydraulic steering pump. The pressure relief valve 24 is optionally a differential pressure area poppet valve, extending parallel to the left and right poppet valves 16, 18 as part of the valve cartridge 50, thereby sharing structural and sealing requirements.

More particularly, the pressure relief valve 24 includes a movable valve member 80 having a hemispherical surface 82 for engaging a conical valve seat 84. The moveable valve member 80 also includes an annular recess 86 adjacent to a valve head 88. As shown in FIG. 9, the moveable valve member 80 defines a longitudinal bore 90 extending entirely therethrough, the moveable valve member 80 being biased in the closed position by a compression spring 92. The pressure relief valve 24 further includes a valve seat 84 that extends at least partially within cartridge housing 50. First and second ports P1, P2 within the third bore 56 allow the transfer of working fluid between pressurized chambers on either side of a steering piston (through screens 72, 74, respectively) when the hydraulic pressure (from P1 or from P2) against the spherical valve head 82 overcomes the spring force of the compression spring 92, which is seated against an adjustable nut 96 extending into the interior of a valve housing.

To reiterate, the pressure relief valve 24 is an optional component of the valve cartridge 22 and is used in conjunction with or in lieu of a relief valve located in the hydraulic steering pump. The pressure relief valve is a bidirectional, differential pressure area poppet valve in the current embodiment, extending parallel to the first and second poppet valves 16, 18. The spherical valve member 82 and the conical valve seat 84 allows the pressure relief characteristic to be equivalent when relieving from the first port P1 to the second port P2 or from the second port P2 to the first port P1, as the effective pressure area does not depend on valve lift. The differential pressure area helps keep the spring force and the spring rate low so that the difference between crack pressure and relief pressure is minimized. Compression spring force is adjusted with the nut 94 to provide relief characteristics at various flows and pressures.

Figure 10:
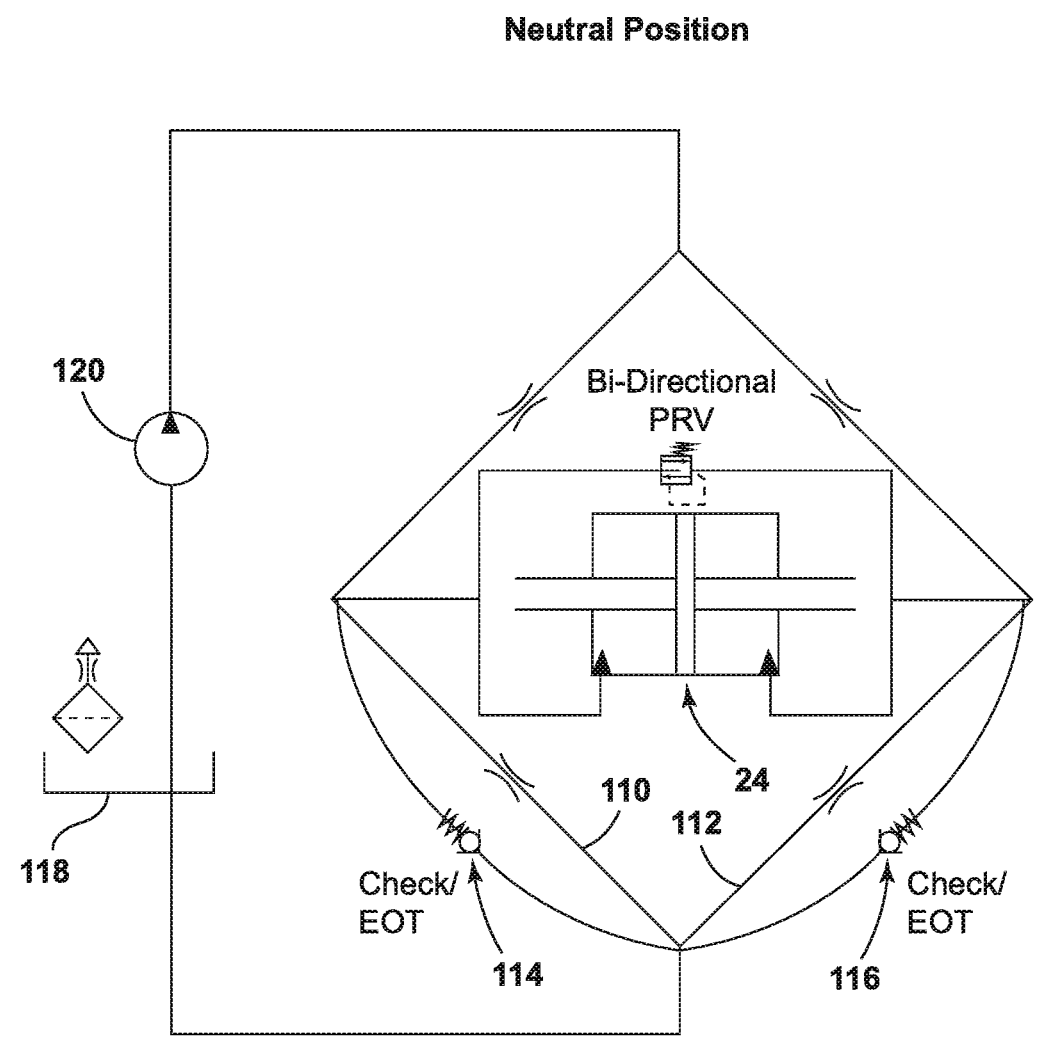
FIG. 10 is a hydraulic diagram illustrating left and right end-of-travel poppet valves and a bi-directional pressure relief valve in the neutral position.
Figure 11:
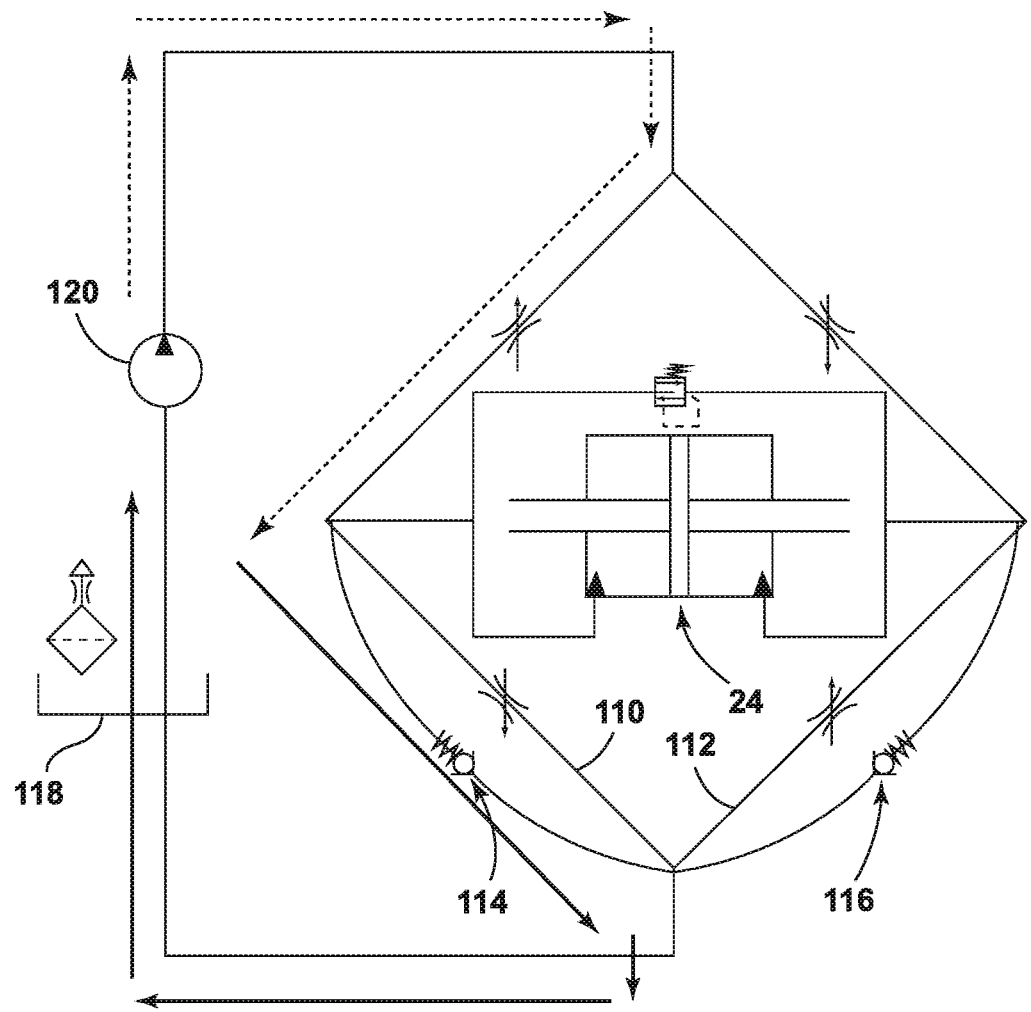
FIG. 11 is a hydraulic diagram illustrating left and right end-of-travel poppet valves and a bi-directional pressure relief valve in an end-of-travel function.
Figure 12:
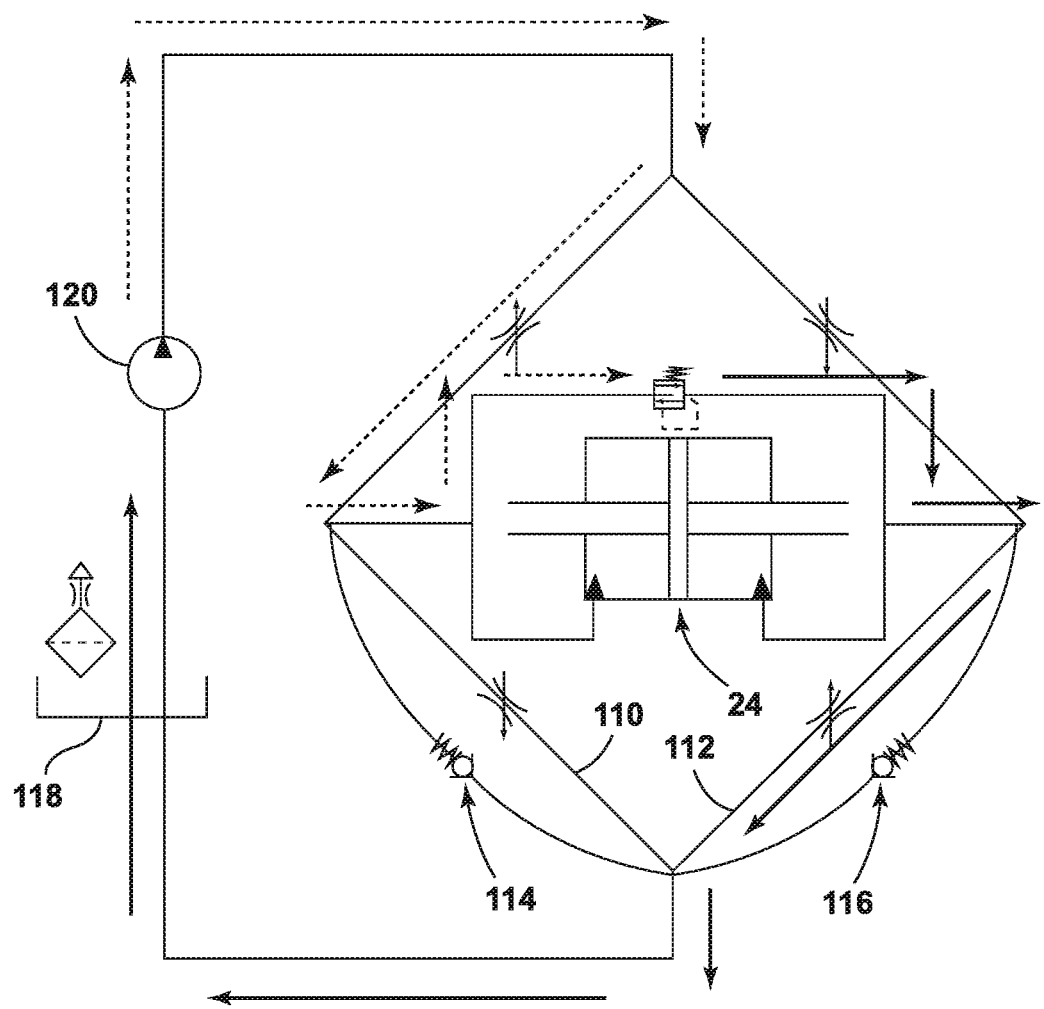
FIG. 12 is a hydraulic diagram illustrating left and right end-of-travel poppet valves and a bi-directional pressure relief valve in a pressure relief function.
Figure 13:
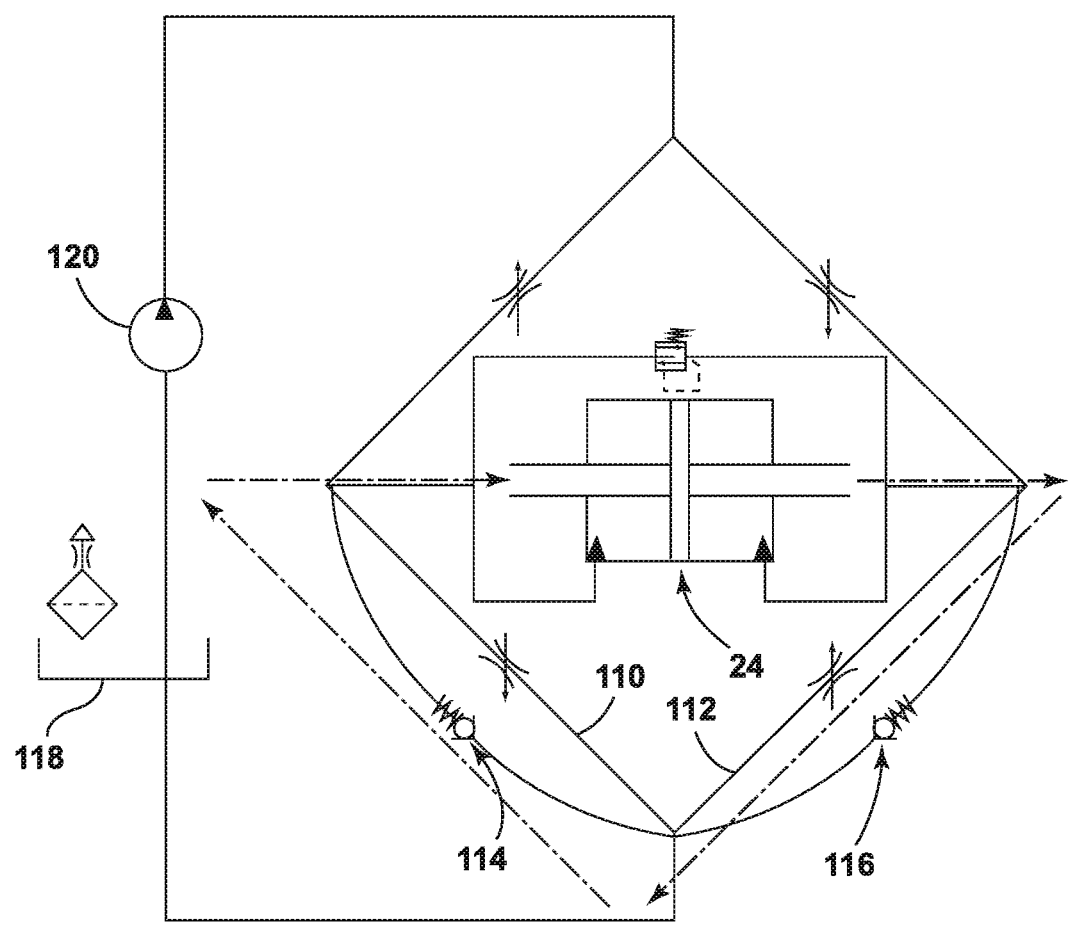
FIG. 13 is a hydraulic diagram illustrating left and right end-of-travel poppet valves and a bi-directional pressure relief valve in a recirculation function.
Figure 14:
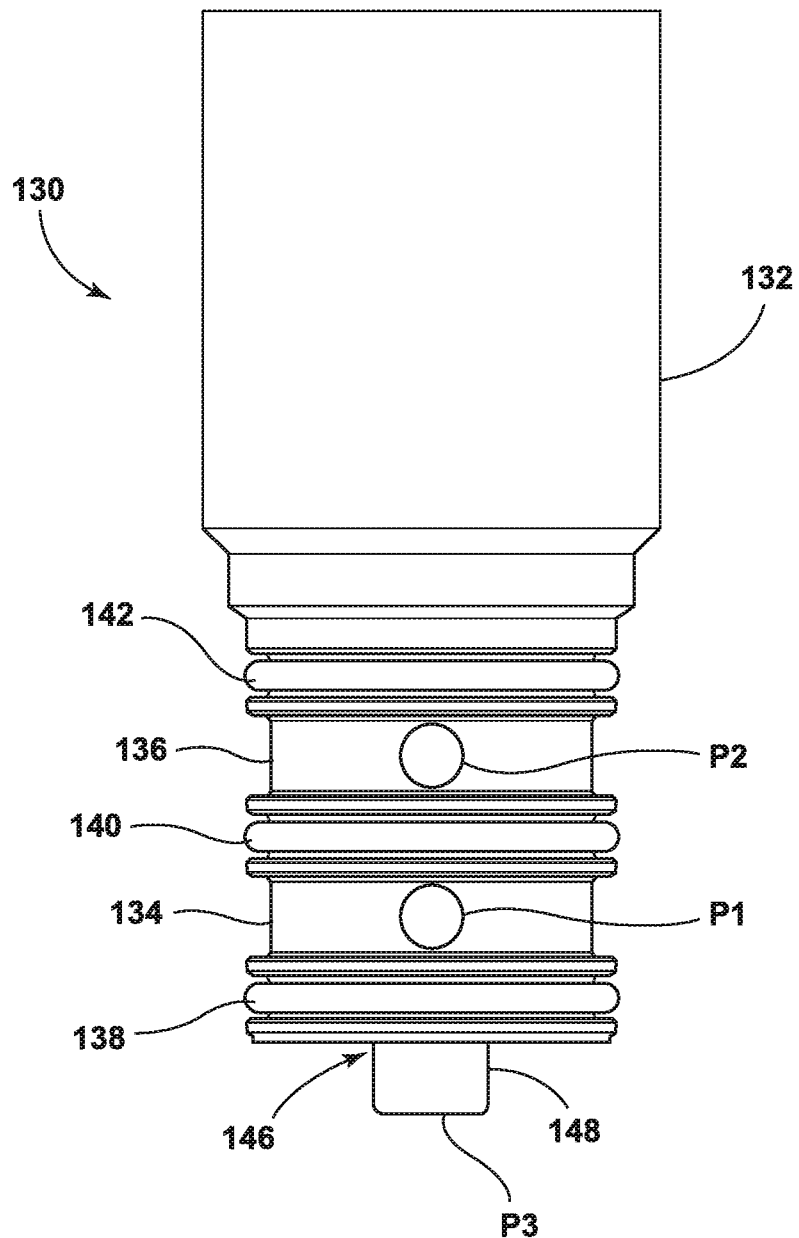
FIG. 14 is side view of a valve cartridge including an integrated pressure relief function and end-of-travel function.

Referring now to FIG. 10, a hydraulic diagram illustrates the pressure relieve valve 24 in the neutral position. The first and second poppet valves 16, 18, when actuated, are in fluid communication with first and second bypass channels 110, 112 that run parallel to first and second check valves 114, 116. The poppet valves 16, 18 divert working fluid to a reservoir 118, which is in fluid communication with a hydraulic pump 120. End-of-travel functionality is depicted in FIG. 11, in which the working fluid is diverted by the first poppet valve 16 to the first bypass channel 110, with the high pressure working fluid depicted as broken arrows and the low pressure working fluid depicted as solid arrows. The actuated poppet valve 16 decreases the pressure within the left pressure chamber (in this example) to provide end-of-travel relief. Pressure relief functionality is depicted in FIG. 12, in which the working fluid is diverted through the pressure relief valve 24 from the left pressure chamber (in this example) to the right pressure chamber. In other words, the pressure relief valve 24 causes the working fluid to flow from the first pressure chamber to the second pressure chamber, optionally in response to a pressure differential between the first and second pressure chambers exceeding a predetermined threshold. Lastly, recirculation functionality is depicted in FIG. 13, in which the valve cartridge 22 is adapted to recirculate pressurized fluid from the left pressure chamber (in this example), through the pressure relief valve 24, to the right pressure chamber. The recirculation functionality is well suited for the internal recirculation of working fluid from one piston chamber to another in the event of a power off condition, for example.

Referring now to FIGS. 14-17, a valve cartridge in accordance with another embodiment is illustrated and generally designated 130. The valve cartridge 130 is functionally similar to the valve cartridge 22 of FIGS. 8-9, except that the end-of-travel valve function is integrated into the pressure relief valve function, such that there is only one poppet valve for actuating the end-of-travel relief function and the pressure relief function.

More specifically, the valve cartridge 130 includes a generally cylindrical housing 132 defining a first port P1, a second port P2, and a third port P3. The valve cartridge 130 is arranged on one side of the power steering assembly, and the first and second ports P1, P2 are in fluid communication with left and right pressure chambers of the power steering assembly, respectively, to circulate hydraulic fluid therebetween. The valve cartridge 130 includes first and second screens (not shown) to enclose the first and second ports P1, P2 to prevent debris from entering the cartridge housing 132. The screens are seated within first and second annular channels 134, 136 bordered by one or more O-rings 138, 140, 142.

Figure 15:
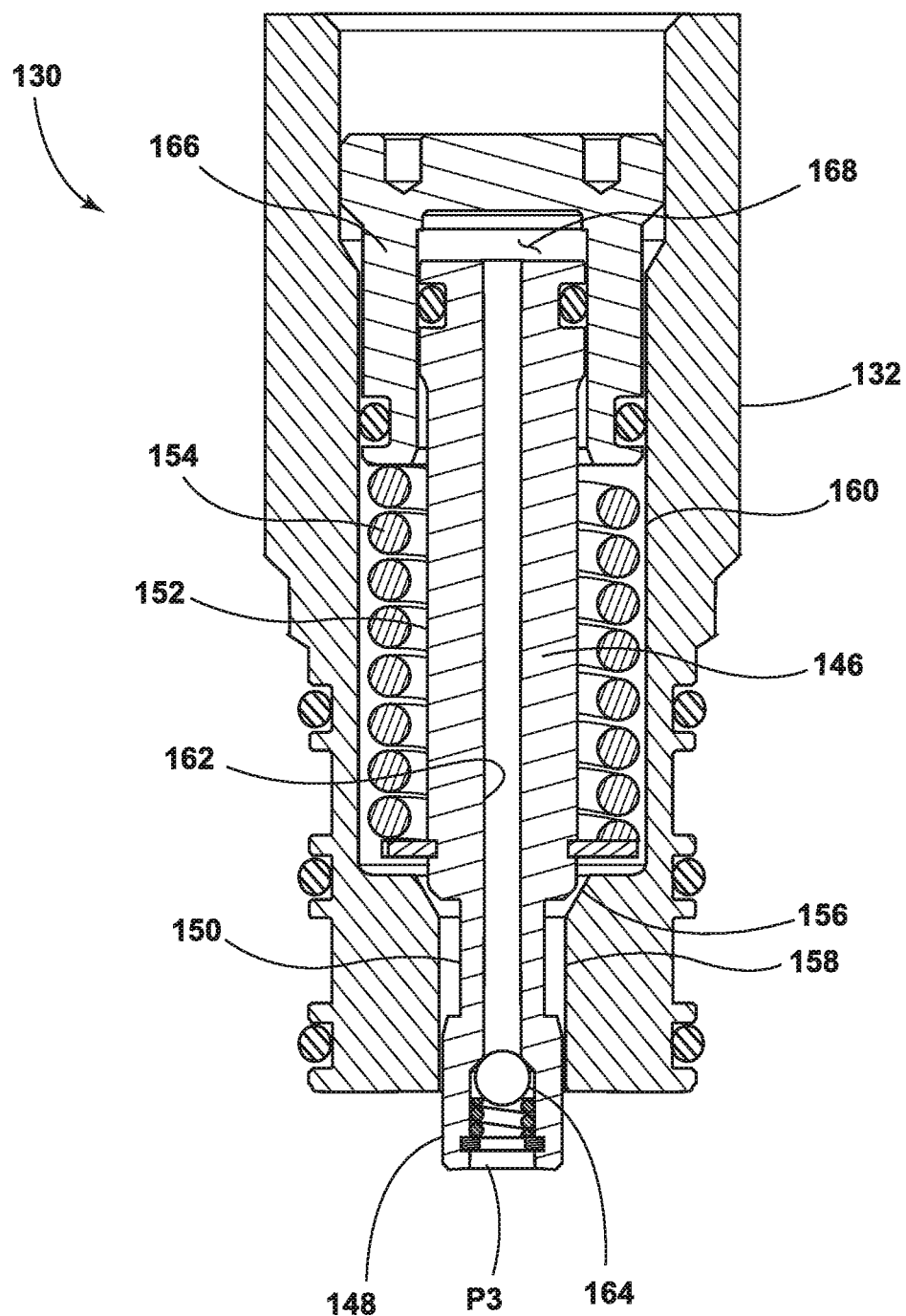
FIG. 15 is a cross-sectional view of the valve cartridge of FIG. 14 illustrating an internal poppet valve and compression spring.

As shown in FIG. 15, the valve cartridge 130 includes a poppet valve 146 having a valve head 148, a narrow stem 150, and a valve body 152. The poppet valve 146 is biased downwardly (in the illustrated orientation) by a compression spring 154, such that the valve body 152 engages a tapered valve seat 156. In this position, the first port 134 is sealed from the second port 136, such that hydraulic fluid does not move therebetween. The valve housing 132 includes a first inner diameter 158 and a second, larger, inner diameter 160, collectively forming a valve guide. An annular channel exists between the first inner diameter 158 of the valve housing 132 and the outer diameter of the narrow stem 150 of the moveable valve member 146. The poppet valve 146 defines a longitudinal bore 162 extending entirely therethrough, the bore 162 including a check valve 164 to allow pressure or air to escape from the third port 138 of the valve cartridge 130. Also contained within the valve cartridge, a valve sleeve 166 is upwardly biased by the compression spring 154 and extends around the valve body 146 defines an internal cavity 168 therebetween.

For pressure relief, the poppet valve 146 actuates in response to the pressure at the first port P1 or the second port P2 exceeding the cracking pressure of the poppet valve 146 (as defined by the compression spring 154). For example, overpressure at port P1 causes the poppet valve 146 to lift against the force of the compression spring 154, such that the valve body 152 no longer engages the valve seat 156. Hydraulic flow then starts from port P1 to port P2, thereby relieving pressure at port P1. When the pressure at port P1 sufficiently lowers, the poppet valve 146 closes and flow is shut off. Also by example, overpressure at port P2 causes the poppet valve 146 to lift, such that the valve body 152 no longer engages the valve seat 156. Hydraulic flow then starts from port P2 to port P1, thereby relieving pressure at port P2. When the pressure at port P2 sufficiently lowers, the poppet valve 146 closes and flow is shut off.

Figure 16:
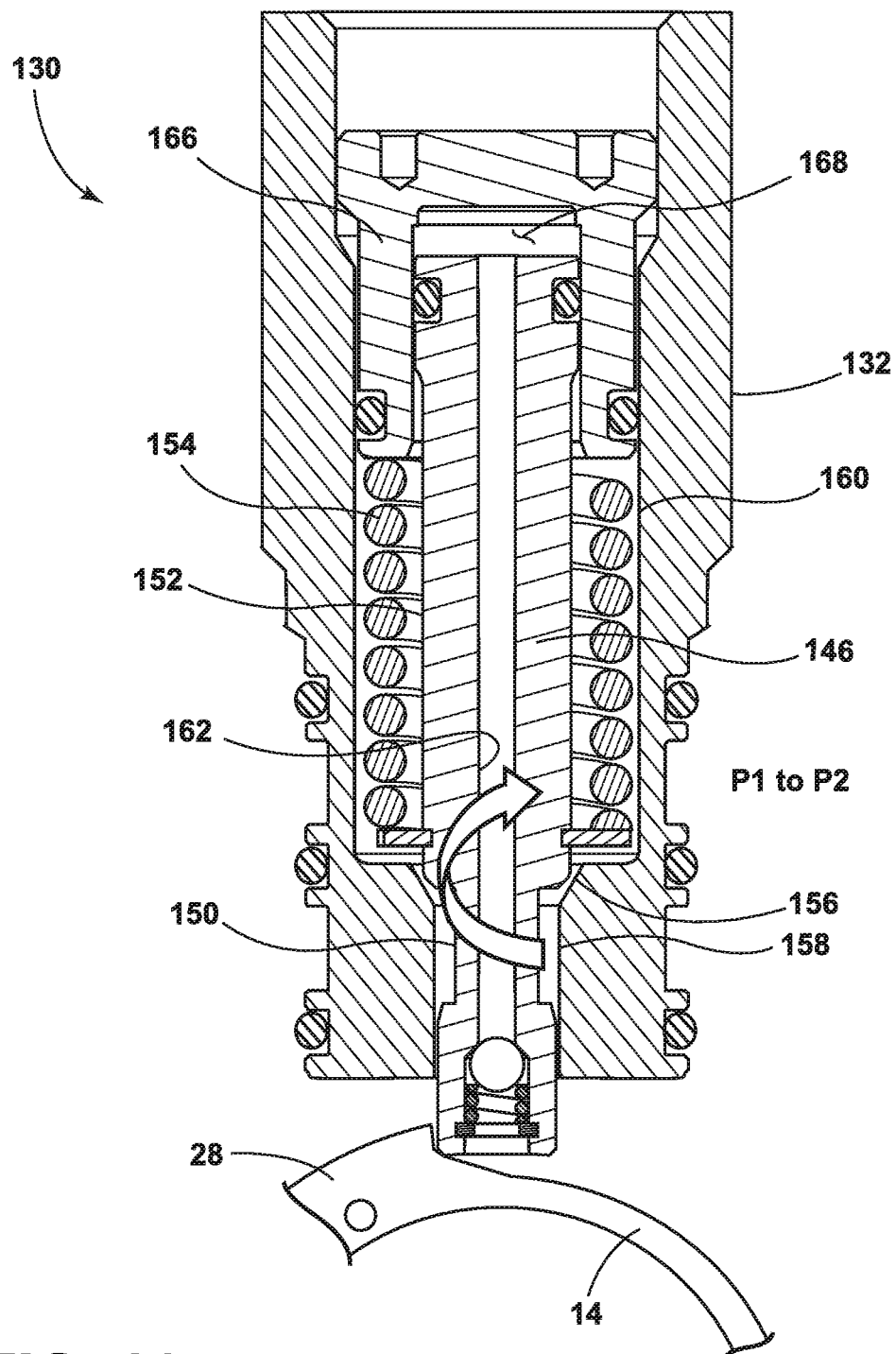
FIG. 16 is a cross-sectional view of the valve cartridge of FIG. 14 illustrating actuation of the end-of-travel function from rotation of a left actuator ring.
Figure 17:
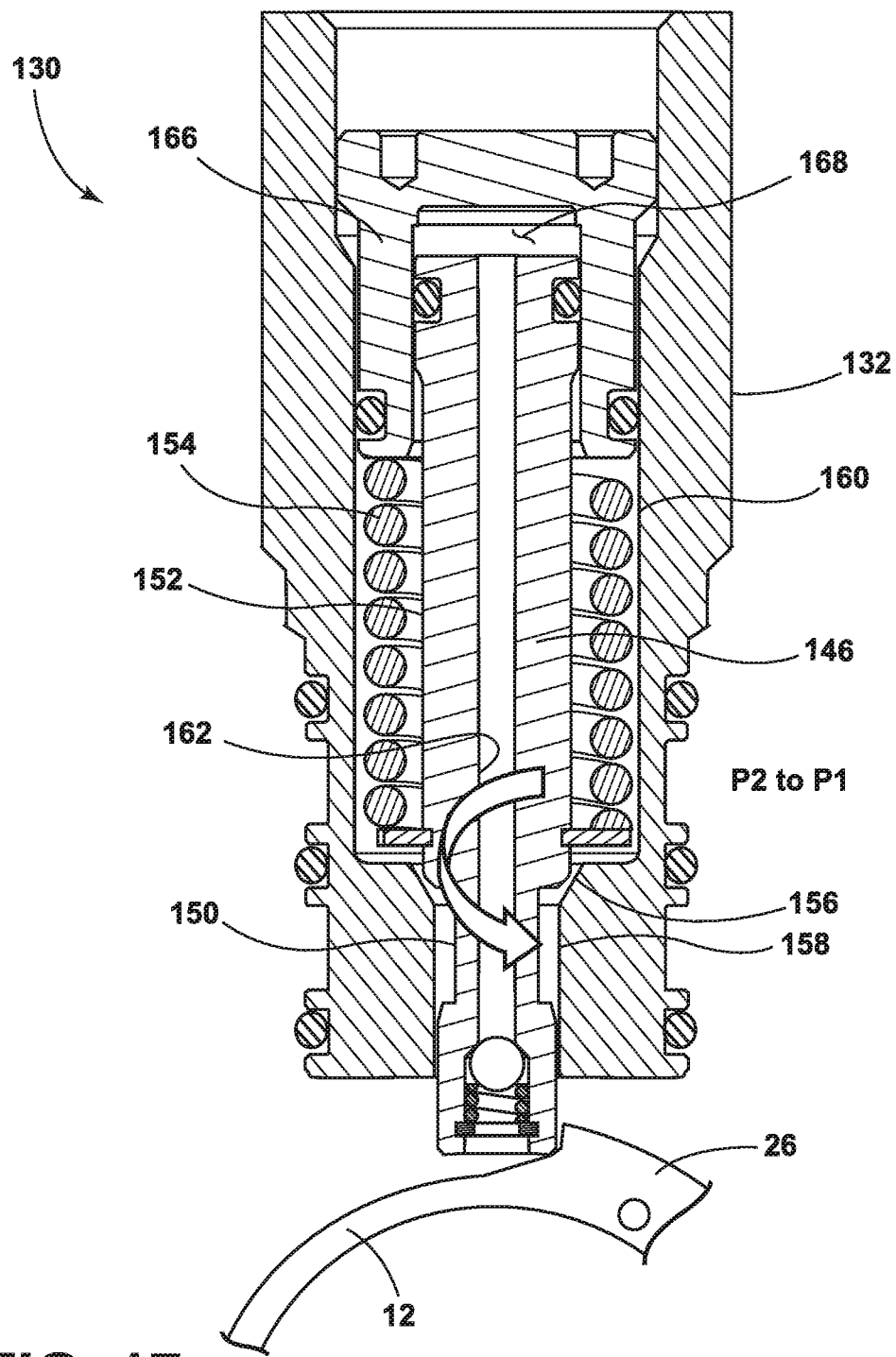
FIG. 17 is a cross-sectional view of the valve cartridge of FIG. 14 illustrating actuation of the end-of-travel function from rotation of a right actuator ring.

For end-of-travel relief, the poppet valve 146 actuates in response to engagement by the first actuator ring 12 or the second actuator ring 14. As shown in FIG. 16 for example, the second actuator ring 14 includes a corresponding cam 28 that, when rotated with the sector gear, engages the valve head 148 and lifts the poppet valve 146 against the force of the compression spring 154, such that the valve body 152 no longer engages the valve seat 156. Hydraulic flow then starts from port P1 to port P2 (because port P1 has a positive pressure differential relative to port P2), thereby relieving pressure at port P1. When the second actuator ring 14 reverses direction, the poppet valve 146 closes, and the flow between port P1 and port P2 is closed. As shown in FIG. 17, the first actuator ring 12 includes a corresponding cam 26 that, when rotated with the sector gear in the opposite direction, engages the valve head 148 and lifts the poppet valve 146 against the force of the compression spring 154, such that the valve body 152 no longer engages the valve seat 156. Hydraulic flow then starts from port P2 to port P1 (because now port P2 has a positive pressure differential relative to port P1), thereby relieving pressure at port P2. When the first actuator ring 12 reverses direction, the poppet valve 146 closes, and the flow between port P1 and port P2 is closed.

For internal fluid recirculation, shown in FIG. 15, the check valve 164 in the valve head 148 allows pressure/air to drain from port P3, but allows exhaust pressure to seal off from port P3. The exhaust pressure instead causes the poppet valve 146 to lift against the force of the compression spring 154, so that flow can recirculate from the greater of port P1 and port P2 to the lesser of port P1 and port P2, thereby allowing hydraulic fluid to recirculate from one side of the steering piston to the other side of the steering piston. When the exhaust pressure at the valve head 148 sufficiently drops, the poppet valve 146 closes, such that the valve body 152 engages the valve seat 156, causing the flow between port P1 and port P2 to terminate.

Figure 18:
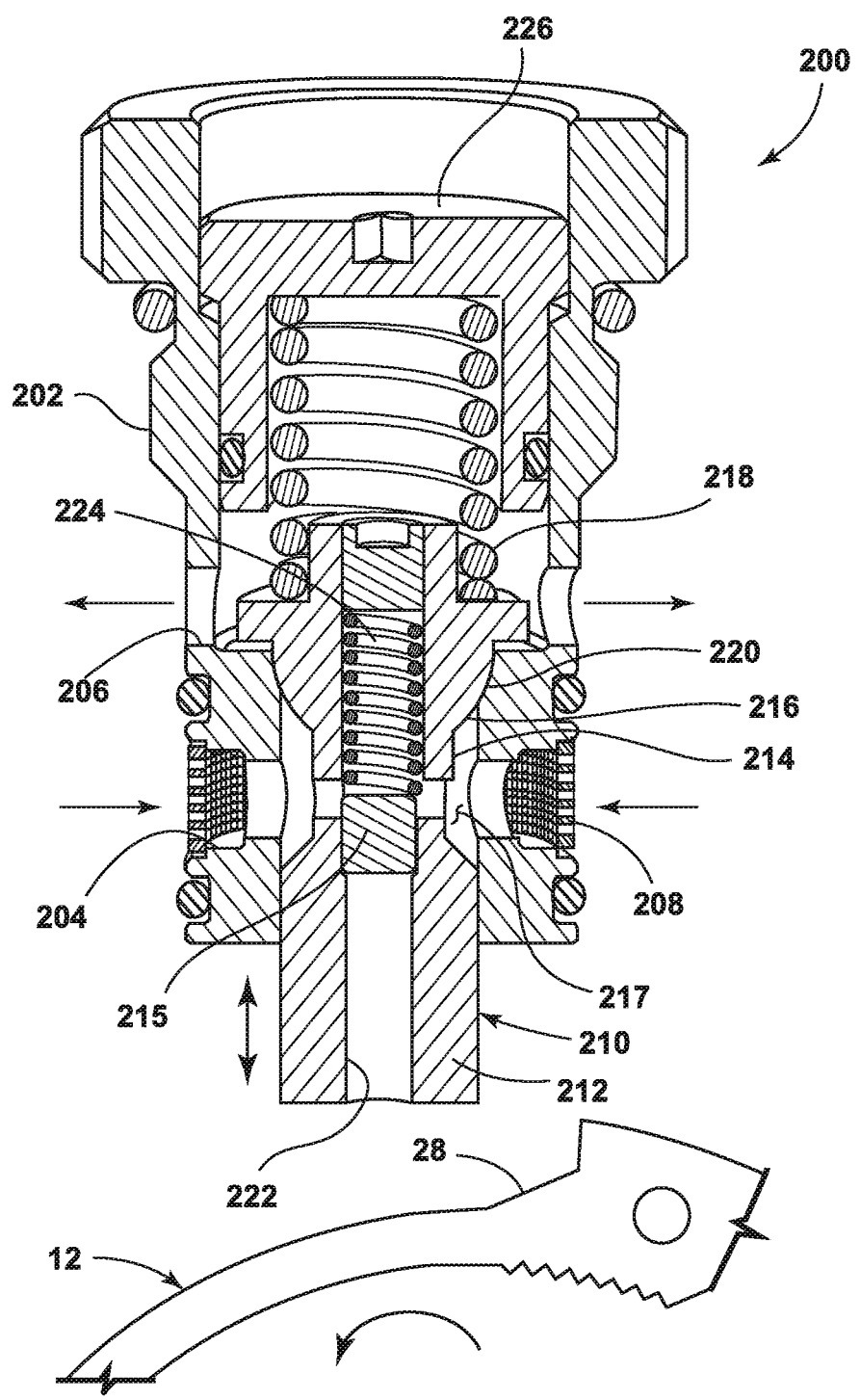
FIG. 18 is a cross-sectional view of a combination valve cartridge including a pressure release function and an end-of-travel function.
Figure 19:
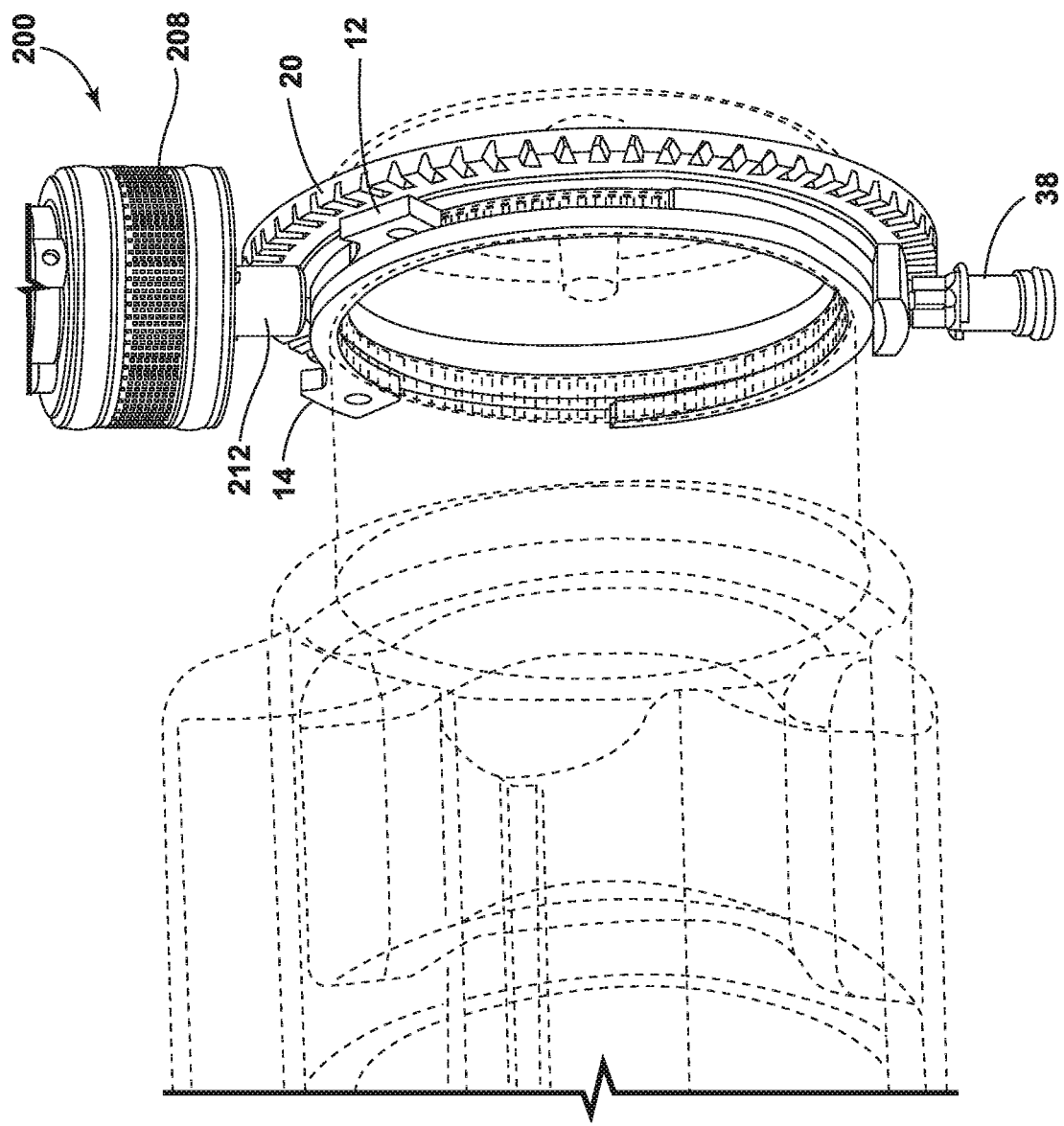
FIG. 19 is a perspective view of the combination valve cartridge of FIG. 18 with end-of-travel actuator rings.

Referring now to FIGS. 18-19, a valve cartridge in accordance with a further embodiment is illustrated and generally designated 200. Similar to the embodiment of FIGS. 14-17, the valve cartridge 200 includes a single poppet valve that is actuated by left and right actuator rings, such that an end-of-travel function is integrated into a pressure relief function.

More specifically, the valve cartridge 200 includes a valve housing 202 defining an inlet 204 and an outlet 206, the inlet (and optionally the outlet) being enclosed within a screen 208. The valve cartridge 200 also includes a poppet valve 210 having a valve head 212, a valve stem 214, and a valve body 216. An annular channel 217 exists between the valve housing 202 and the valve stem 214. In the position as shown in FIG. 18, the annular channel 217 is open to the inlet 204 but closed to the outlet 206. The poppet valve 210 is biased downwardly by a compression spring 218, such that the valve body 216 engages a valve seat 220. In this position, the inlet 204 is sealed off from the outlet 206, such that hydraulic fluid does not move therebetween. The valve body 216 and valve seat 220 are hemispherical in the current embodiment by can be tapered, disc-shaped, or conical in other embodiments. The poppet valve 210 also defines a longitudinal bore 222 extending entirely therethrough, the bore 222 including a biasing spring 224 for a check valve 215. The check valve 215 is illustrated as a cuboid in FIG. 18, but is optionally a ball check valve in other embodiments. An adjustable nut 226 allows variation of the poppet valve cracking pressure by raising or lowering the adjustable nut 226 within the valve housing 202, the adjustable nut 226 being in threaded engagement with the valve housing 202.

For pressure relief, the poppet valve 210 actuates in response to the pressure at the inlet 204 exceeding the cracking pressure of the poppet valve 210 (as defined by the compression spring 218). For example, overpressure at the inlet 204 causes the poppet valve 210 to lift against the force of the compression spring 218, such that the valve body 216 no longer engages the valve seat 220. Hydraulic flow then starts from the inlet 204 to the outlet 206, thereby relieving pressure at the inlet 204. When the pressure at the inlet 204 sufficiently lowers, the poppet valve 210 closes and flow is shut off. For end-of-travel relief, the poppet valve 210 actuates in response to engagement by the first actuator ring 12 or the second actuator ring 14, best shown in FIG. 19. Each actuator ring 12, 14 includes a cam 28 that, when rotated with the sector gear, engages the valve head 212 and lifts the poppet valve 210 against the force of the compression spring 218, such that the valve body 216 no longer engages the valve seat 218. Hydraulic flow then starts from the inlet 204 to the outlet 206, in the same flow direction as with the pressure relief valve function, thereby relieving pressure at the inlet. When the actuator ring 12 or 14 reverses direction, the poppet valve 210 closes, and the flow between the inlet 204 and the outlet 206 terminates.

Though described above as an integrated construction, alternative embodiments include the implementation of end-of-travel relief and pressure relief as separate features. Still further optionally, alternative embodiments include the integration of end-of-travel relief and pressure relief directly into the steering assembly without the use of a combination cartridge. Still further optionally, the actuator rings can be implemented with various cam arrangements to coordinate with end-of-travel poppets, setting, and resetting actuators.

The above description is that of current embodiments. Various alterations and changes can be made without departing from broader aspects of the invention as defined in the appended claims, which are to be interpreted in accordance with the principles of patent law including the doctrine of equivalents. This disclosure is presented for illustrative purposes and should not be interpreted as an exhaustive description of all embodiments or to limit the scope of the claims to the specific elements described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A power steering assembly comprising:
   a sector gear moveable in clockwise and counterclockwise directions for right and left turn steering, the sector gear including a sector gear shaft extending therefrom;
   an end-of-travel mechanism mounted to the sector gear shaft, the end-of-travel mechanism including:
      a left actuator ring extending partially around the sector gear shaft and including a first cam extending radially therefrom,
      a right actuator ring extending partially around the sector gear shaft including a second cam extending radially therefrom; and
   a valve cartridge including at least one poppet valve engageable by the first cam in response to rotation of the sector gear in a first direction.

2. The power steering assembly of claim 1 wherein the at least one poppet valve includes a first poppet valve, the valve cartridge further including a second poppet valve engageable by the second cam in response to rotation of the sector gear in a second direction.

3. The power steering assembly of claim 1 further including a reset gear including first and second tangs for resetting the left and right actuator ring, respectively, wherein the left actuator ring and the right actuator ring rotate in fixed relation relative to the sector gear shaft, and wherein the reset gear is independently rotatable relative to the sector gear shaft.

4. The power steering assembly of claim 3 wherein the sector gear shaft is splined and wherein the left and right actuator ring include a radial spring force to selectively disengage from the sector gear shaft during re-setting of the left and right actuator ring.

5. The power steering assembly of claim 1 further including a rotatable screw gear that is intermeshed with gear teeth on an axial surface of the reset gear.

6. The power steering assembly of claim 1 wherein the valve cartridge includes a pressure relief valve.

7. The power steering assembly of claim 6 wherein the pressure relief valve is a bidirectional poppet valve.

8. The power steering assembly of claim 6 wherein the pressure relief valve is in fluid communication with first and second pressure chambers on opposing sides of a steering piston.

9. The power steering assembly of claim 8 wherein the pressure relief valve causes pressurized fluid to flow from the first pressure chamber to the second pressure chamber in response to a pressure differential between the first and second pressure chambers exceeding a predetermined threshold.

10. The power steering assembly of claim 8 wherein the valve cartridge is adapted to recirculate pressurized fluid from the first pressure chamber, through the pressure relief valve and through the at least one poppet valve, to the second pressure chamber.

11. A valve cartridge for an end-of-travel mechanism having left and right actuator rings extending partially around an output shaft, the valve cartridge comprising:
- a valve housing; and
- at least one poppet valve contained within a bore defined within the valve housing, the at least one poppet valve being adapted to be engaged by the left and right actuator rings and including a valve head for engaging a valve seat defined by the valve housing,
- wherein the at least one poppet valve is adapted to provide end-of-travel relief for a hydraulic steering assembly, and wherein the at least one poppet valve is adapted to be in fluid communication with first and second pressure chambers on opposing sides of a steering piston.

12. The valve cartridge of claim 11 wherein the at least one poppet valve is a bidirectional valve including a hemispherical valve member and a conical valve seat.

13. The valve cartridge of claim 11 wherein the at least one poppet valve causes a working fluid to flow from the first pressure chamber to the second pressure chamber in response to a pressure differential between the first and second pressure chambers exceeding a predetermined threshold.

14. The valve cartridge of claim 11 wherein the valve housing includes an adjustable valve sleeve for varying the compression force of a valve spring contained therein.

15. The valve cartridge of claim 11 wherein the valve housing defines an inlet port in fluid communication with the poppet valve.

16. The valve cartridge of claim 15 wherein the inlet port opens to an annular channel enclosed by a screen filter.

17. A valve cartridge for an end-of-travel mechanism having left and right actuator rings extending partially around an output shaft, the valve cartridge comprising:
- a valve housing including a first port that opens to a first internal chamber and a second port that opens to a second internal chamber, the valve housing including a valve seat that interconnects the first internal chamber with the second internal chamber;
- a poppet valve contained within the valve housing and including a valve head partially housed within the first internal chamber, a valve body at least partially housed within the second internal chamber, and a valve stem extending between the valve head and the valve body; and
- a compression spring to bias the valve body against the valve seat, thereby closing the first internal chamber from the second internal chamber, wherein the poppet valve is adapted to provide end-of-travel relief for a hydraulic steering assembly in response to actuation of the left and right actuator rings and adapted to provide pressure relief to first and second pressure chambers on opposing sides of a steering piston.

18. The valve cartridge of claim 17 wherein the valve seat includes a tapered surface.

19. The valve cartridge of claim 17 wherein the valve housing includes an adjustable valve sleeve for varying the compression force of a valve spring contained therein.

20. The valve cartridge of claim 17 wherein the first and second ports open to first and second annular channels, respectively.

* * * * *